United States Patent [19]

Resnick

[11] 4,006,974
[45] Feb. 8, 1977

[54] EYEGLASS STRUCTURE

[76] Inventor: Sam L. Resnick, 15-43 200th St., Bayside, N.Y. 11360

[22] Filed: Sept. 26, 1975

[21] Appl. No.: 617,047

[52] U.S. Cl. .................................. 351/59; 351/41
[51] Int. Cl.$^2$ ........................................ G02C 9/02
[58] Field of Search ................... 351/41, 59, 52, 57

[56] References Cited

UNITED STATES PATENTS

| | | | |
|---|---|---|---|
| 2,598,107 | 5/1952 | Brandvig | 351/41 |
| 3,495,898 | 2/1970 | Del Vecchio | 351/41 |
| 3,701,591 | 10/1972 | Wichers | 351/41 |
| 3,840,294 | 10/1974 | Kneier | 351/59 |

Primary Examiner—Harold A. Dixon
Attorney, Agent, or Firm—Arthur L. Plevy

[57] ABSTRACT

There is disclosed an eyeglass or spectacle configuration which includes a pair of viewing lenses coupled together by means of a bridge element which further includes a backing suitably treated to enable retention of the same on the skin of a user in proximity to the user's forehead to thereby suspend the lenses in front of the user's eyes; thus eliminating conventional temple members and nose bridges typically and commonly associated with the prior art eyeglasses.

10 Claims, 7 Drawing Figures

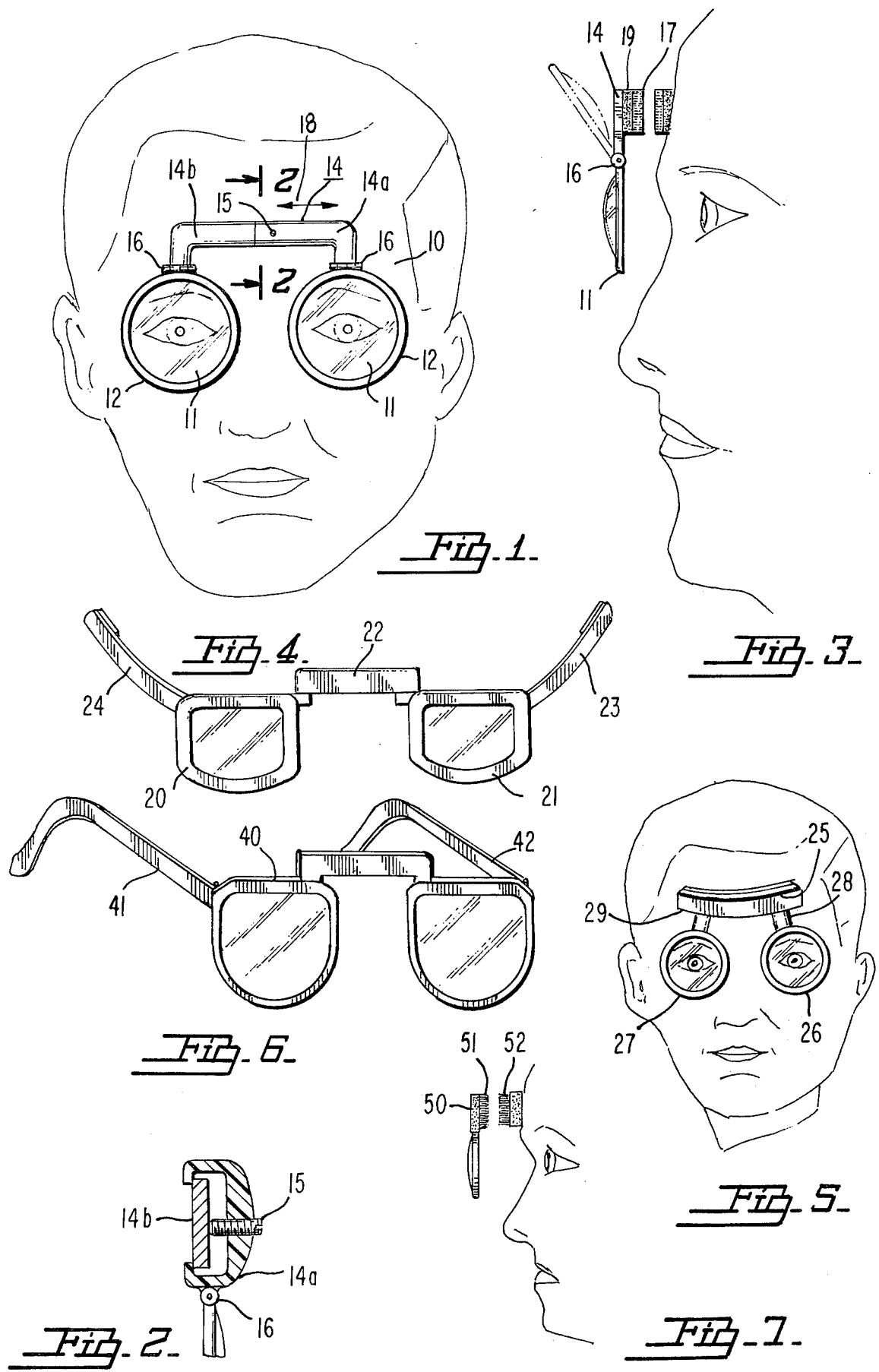

EYEGLASS STRUCTURE

BACKGROUND OF INVENTION

This invention relates to eyeglass configurations and more particularly to an eyeglass structure which eliminates the necessity of utilizing temple members and nose bridges.

An investigation of the spectacle or eyeglass art will enable one to envision the development of spectacles or eyeglasses as commonly employed today. It is correct to state that the plurality of corrective lenses are housed in a frame, which conventionally includes two temple members which rest above the ears of the user and press on the sides of the user's head. These frames also include a nose piece or a nose bridge for positioning and holding the lenses in proper orientation to the eyes of the user.

The nose bridge typically rests on the side surfaces of the user's nose, while other apparatus such as a monocle which is self-adhering and things as goggles which employ elastic bands, have been utilized.

It is clear that the traditional eyeglass frame has been the cause of much irritation and discomfort to many wearers. The problem has been depicted in the prior art as can be ascertained by a perusal of U.S. Pat. No. 758,629, patented on May 3, 1904 by George Eason and entitled SPECTACLE-HOLDER. This patent depicts the problem particularly related to the nose bridge and there is an attempt to circumvent this by the use of a spring, which extends over the top of the person's head to retain a spectacle frame in proper relation to his eyes.

To further define the nature of the problem, there are available to conventional eyeglass wearers, a plurality of devices which serve to alleviate or reduce the discomfort. Such devices are commercially available as cushion pads to protect the nose as well as pads to protect ears and so on.

It is also noted that typical eyeglasses frequently slip or dislodge, thus affecting the user's vision or requiring the user to perform constant adjustments by pushing or further positioning the eyeglass and frame.

Furthermore, the traditional form of eyeglasses cannot be used by many people after nose surgery or ear surgery, due to the pressures exerted by conventional frame members. It is, of course, understood that people who are handicapped due to the loss of an ear or otherwise, could not be accommodated by the conventional eyeglass frame.

It is therefore an object of the present invention to provide an improved eyeglass configuration which can be fastened to a user's forehead by means of a suitable means, glue or adhesive.

Various configurations are shown which serve to eliminate the nose bridge and the temples as found in conventional prior art spectacle frames.

Other embodiments utilize temple pieces, but eliminate the necessity for the nose bridge.

BRIEF DESCRIPTION OF PREFERRED EMBODIMENT

A spectacle apparatus adapted to be supported and worn by a user comprising first and second lens assemblies, a bar located between said lens assemblies and having a back surface for accommodating means for application of the same to the forehead area of a user, said bar as located causing said lens assemblies to be positioned each in front of a respective eye of the user.

BRIEF DESCRIPTION OF FIGURES

FIG. 1 is a front perspective view showing eyeglass apparatus according to this invention employed by a user.

FIG. 2 is a cross sectional view taken through line 2—2 of FIG. 1.

FIG. 3 is a side elevational view of apparatus according to this invention.

FIG. 4 is a front perspective view of an alternate embodiment according to this invention.

FIG. 5 is a front perspective view of still another embodiment being accommodated by a user.

FIG. 6 is a perspective view of a frame assembly employing temple members with the elimination of a nose bridge configuration.

FIG. 7 is a side view of another fastener.

DETAILED DESCRIPTION OF FIGURES

Referring to FIG. 1, there is shown a user 10, who requires the use of correctional lenses due to a vision impairment. Conventional lenses as 11 may be contained within a rim 12, which can be fabricated from a plastic, metal or other suitable material and can encompass many different geometrical configurations and basically is consistent with those conventional rims or lens holders found on modern day spectacles.

The lenses are coupled together by means of a member 14, which will be designated as a forehead bridge. The member 14 may be fabricated from a plastic or other relatively soft and pliable material and may be integrally formed with the lens frames 12, or may be a composite member capable of adjustment, as indicated in the direction of arrow 18, if adjustable.

The member 14 comprises a first unit 14A which can be slideably positioned with respect to a second unit 14B and the use of a typical retention device as a simple screw or stop pin 15 can be employed to fix the spacing of the lens 11, once adjustment of the unit has been made according to the separation of the eyes of the user.

Referring to FIG. 2, there is shown a cross sectional view taken through line 2—2 of FIG. 1, indicating how one form of the arrangement for providing adjustability can be implemented. It is seen that the member 14A constitutes a C-shaped channel. A member as 14B of a relatively rectangular cross section is slideably mounted therein. An adjustment screw or bar as 15 then secures the C-shaped channel 14A with the slideable bar 14B to prevent further movement after proper adjustment is attained.

The forehead bar 14 may be slightly curved to adjust to the contour of the user's head and as such, may be fabricated from a relatively pliable material; as used in present frames.

The apparatus thus depicted is held in place by means of a suitable adhesive which is applied to the back surface of the forehead bar 14. Such adhesives are readily available, as surgical adhesives or double backed tapes and are employed in retaining various items to the skin of a user.

Referring to FIG. 3, there is shown a side view of the user's head 10 showing a pad 9, which may accommodate a suitable adhesive as 17 for direct application to the forehead of a user.

Alternatively, a double backed tape, such as the type employed in securing hair pieces, may be applied to the forehead of the user and serves to receive the padded area located behind the forehead bar 14.

The lens frames 11 may be pivotally hinged by means of a hinge 16 so that the user can rotate the lens away from the eye, if desired. The position of the rotated lens is shown in FIG. 3 as a dashed line configuration.

It is, of course, clear that the configuration shown in FIG. 1 does not exert any force whatsoever on the user's nose or on the ears of the user and is a light weight eyeglass configuration, which is secured to the face of a user by means of a conventional adhesive; or other device such as a magnetic means.

FIG. 4 depicts an alternate embodiment which again includes two lens assemblies as 20 and 21, suitably spaced by means of a forehead bar 22, which has a back surface adjusted to accommodate an adhesive for gluing the forehead bar at a proper location on the face of a user.

The bar 22 depicted in FIG. 4 is shorter in area, creating a different surface configuration for the eyeglasses.

It is understood that the bars as well as the lens holders can be treated to provide aesthetic designs using conventional modes providing surface decoration for the eyeglass assembly.

FIG. 4 also shows another embodiment which consists of two tabs as 23 and 24 extending respectively from the lens frames 20 and 21 and fabricated from a soft plastic or other pliable material. Each member as 23 and 24 includes an adhesive accomodating surface so that the eyeglass structure can be secured on the face of a user by the application of adhesive to the members 23 and 24 or by the application of a suitable adhesive to the members 22, 23 and 24.

Referring to FIG. 5, there is shown still another configuration which comprises a relatively elongated forehead bar 25, which supports two lens frame assemblies 26 and 27 by coupling rods or members 28 and 29. The forehead bar may be fabricated from a preformed plastic spring-like material or metal and operates similar to a partial headband. The bar has a curvature and a surface configuration which is curved to the forehead of the user and then held in place by means of an adhesive or a double backed tape, or by pressure exerted by the bar.

FIG. 6 also shows an eyeglass assembly also employing a forehead bar which again, may be glued to the forehead of a user by means of a non-irritating surgical adhesive.

The frame assembly 40 shown in FIG. 6 also employs conventional temple members 41 and 42, as the main function of this apparatus is to eliminate the particularly troublesome nose bridge.

Referring to FIG. 7, there is shown an alternate means of applying the eyeglass structure 50 the the forehead of a user. The bridge of the structure 50 is supplied with a series of magnetic threads or mesh material 51 marketed under the trade name of "Velcro". The user has a coacting member 52 secured to his forehead by means of any suitable glue and hence, the eyeglass structure can be selectively emplaced or removed, as desired.

The Velcro mesh is known in the art and has been used in lieu of zippers and other fastening devices found on clothing and so on. It is, of course, apparent that there are many other fastening arrangements which can be used to secure the glasses to the face of a user.

Other configurations as well as alternate designs should become apparent upon reading of this application. It is noted that the invention provides a completely new apparatus for utilizing and retaining corrective lens which can eliminate both the nose bridge and temples and which will avoid irritation associated with prior art frames.

The adhesives contemplated and as briefly indicated above, are used in the application of false eyelashes and so on and are relatively mild and non-toxic and do not irritate the skin as they are used in the eye area of the female.

The above noted specification also contemplates other means for securing the glasses as shown, which may include magnetic type devices, as shown in FIG. 7 or other types of adhesives.

It is also understood that the word "pliable" as well as "plastic" includes those types of plastic which are presently employed in eyeglass frames as well as other types.

The apparatus can also apply to non-corrective lenses such as those used in sun glasses and so on; where the user will gain the advantages described above.

As indicated above, there are certain other tapes and so on used in placing hairpieces and toupees, which can be employed on the forehead bridges according to the teachings of the above invention.

These and other embodiments will become clear upon reading of the above specification and all such improvements are deemed to be encompassed within the spirit and scope of the claims appended hereto.

I claim:

1. A spectacle apparatus adapted to be supported and worn by a user comprising first and second lens assemblies, a bar located between said lens assemblies and having a back surface including an adhesive for direct coupling of the bar to the forehead area of a user, said bar as located causing said lens assemblies to be positioned each in front of a respective eye of the user.

2. A method of supporting a pair of viewing lens assemblies in proper orientation on the face of a user to enable the user to look through said lens assemblies for vision correction comprising the steps of securing said lens assemblies at a predetermined distance one apart from the other, as determined by the separation of the eyes of said user and adhesively bonding said lens assemblies on the face of said user to secure the same thereto at said proper orientation with said lenses positioned away from the eyes of the user, but proximate thereto for correction to his vision.

3. A spectacle apparatus adapted to be supported and worn by a user requiring a visual correction comprising first and second lens assemblies, a forehead member positioned above said lens assemblies and means for coupling said lens assemblies to said forehead member at a distance determined by the separation of the eyes of said user; whereby said lens assemblies are positioned in front of said user's eyes to provide correction when said forehead member is bonded to the forehead of a user by means of a suitable adhesive.

4. The apparatus according to claim 3 wherein said forehead member comprises a flexible pliable bar adapted to be adjusted to the contour of a user's forehead.

5. The apparatus according to claim 3 wherein said adhesive is a double backed tape wherein one side is secured to said forehead member.

6. The apparatus according to claim 3 wherein said lens assemblies are pivotally coupled to said forehead member to enable said user to pivotally move one or the other.

7. The apparatus according to claim 3 further comprising a first and second tab extending from said lens assemblies and adapted to accommodate glue for further securing said spectacle apparatus to the skin of a user.

8. The apparatus according to claim 3 wherein said forehead member comprises a first bar having a C-shaped cross section and a second bar slideably mounted within the channel of said C-shaped bar, means for mounting one lens assembly on said first bar and the other on said second bar and means coupled to said bars for locking one to the other as determined by the eye separation of a user.

9. The apparatus according to claim 3 further comprising first and second temple members extending respectively from said first and second lens assemblies.

10. The apparatus according to claim 3 wherein said forehead member is fabricated from a plastic.

* * * * *